Aug. 22, 1967

C. L. ENGLISH 3,336,941

CONSTANT VOLUME FLOW CONTROL VALVE

Filed Nov. 9, 1964

INVENTOR.
CHARLES L. ENGLISH

BY
Dunlap & Laney
ATTORNEYS

Aug. 22, 1967 C. L. ENGLISH 3,336,941
CONSTANT VOLUME FLOW CONTROL VALVE
Filed Nov. 9, 1964 3 Sheets-Sheet 2
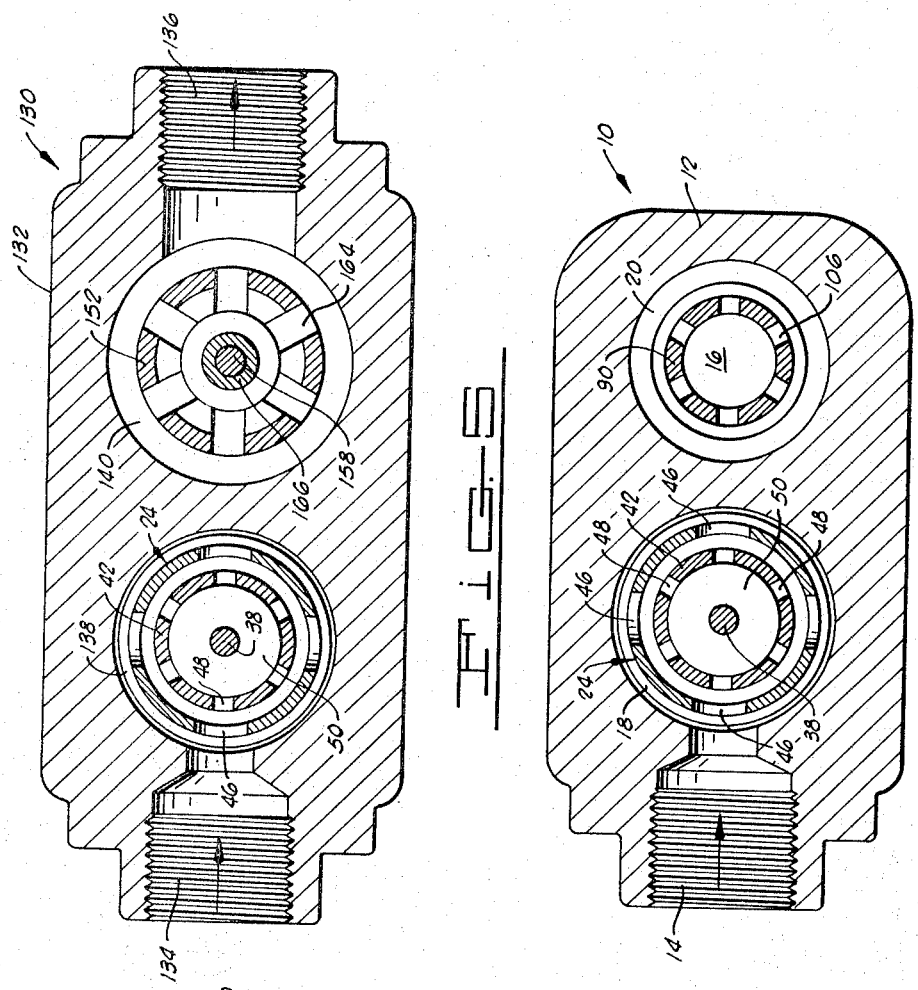
INVENTOR.
CHARLES L. ENGLISH
BY
Dunlap & Laney
ATTORNEYS

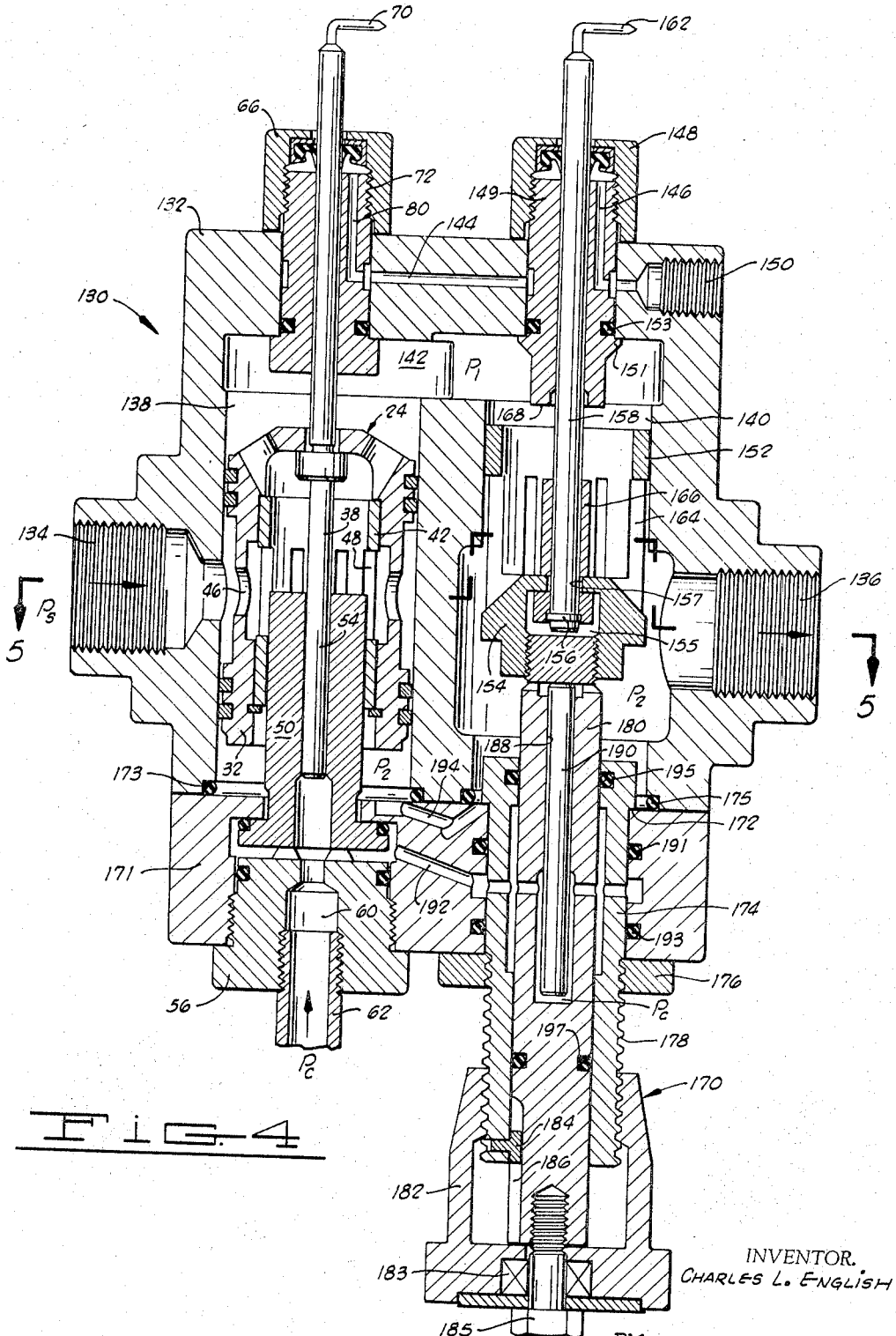

United States Patent Office 3,336,941
Patented Aug. 22, 1967

3,336,941
CONSTANT VOLUME FLOW CONTROL VALVE
Charles L. English, 2204 E. 25th Place, Tulsa, Okla. 74114; Marcia K. English, executor of said Charles L. English, deceased
Filed Nov. 9, 1964, Ser. No. 409,756
11 Claims. (Cl. 137—501)

This invention relates generally to improved flow control valves. More particularly, but not by way of limitation, this invention relates to an improved flow control valve useful in maintaining a constant volume of fluid flow through a hydraulic circuit or the like.

In many instances, it is preferable to drive fluid motors at a constant speed regardless of the varying loads imposed thereon. For example, it may be desired to have the output shaft of a rotary hydraulic motor rotate at a constant speed despite the fact that the load thereon may vary. Also, it may be desired to drive a reciprocating hydraulic motor at a constant velocity throughout a stroke even though the load applied during the power portion of the stroke will be considerably greater than during the return portion of the stroke.

Constant flow control valves are particularly useful in connection with reciprocating motors driving subsurface pumps used to pump oil wells. Subsurface oil well pumps are designed to have an optimum operating speed which will result in the most efficient oil production. It can be appreciated, however, that the load which the oil well pump is attempting to move will vary considerably. The variation in load may be due to the well "pumping down," i.e., if the pump is moving oil at a greater rate than the oil is produced into the well from the surrounding strata, the level of the oil in the well will decrease during pumping so that the oil must be lifted a greater distance. To lift the oil a greater distance to the surface it is necessary to expend a greater amount of force and energy than when the oil was at the higher level.

The load on the pump may also be greatly decreased in the event that the oil well is producing some gas with the oil. The gas enters the production tubing, mixing with the oil and thereby decreasing the density of the liquid column. Reducing the density of the liquid reduces the amount of force necessary to pump the oil and the gas mixture from the well. From the foregoing, it can be seen that in one stroke of the pump, the fluid motor must exert sufficient force to lift a full column of liquid to the surface while on the next stroke, assuming that the gas has entered the fluid column, it will be necessary to lift a considerably lighter column, requiring considerably less force and energy.

If the hydraulic circuit delivering fluid to the motor driving the pump is adjusted to provide sufficient pressure and volume of fluid to produce the oil when the oil level in the well is at a higher level, it can be seen that the pump and the fluid motor will run considerably slower than when the well is "pumped down." On the other hand, if the well is producing gas, and the hydraulic circuit is adjusted to pump oil having a normal column weight, it can be seen that the lighter column will require less force. Therefore, the pump and motor will run considerably faster. In some instances, the pump and motor have run so fast that they have destroyed or severely damaged themselves.

Varying loads have been compensated for by the installation of a constant flow control valve in the hydraulic circuit delivering power fluid to the hydraulic motor. Constant flow control valves constructed in the past have been manufactured in a variety of configurations and as far as is known, all constant flow control valves previously manufactured have included two basic components. The basic components have been a variable orifice mechanism which operates in conjunction with a fixed orifice. The variable orifice generally has been disposed between the fluid supply to the valve and the fixed orifice. The size of the flow passageway through the variable orifice is most often controlled by moving the variable orifice member in response to the difference in the upstream and downstream pressure as measured across the fixed orifice. The arrangement of such valves is such that an attempt is made therein to maintain a constant pressure drop across the fixed orifice and therefore maintain a constant volume of fluid flowing therethrough to the hydraulic motor.

All constant flow control valves that have been constructed heretofore have included one or more springs which are arranged to bias the variable orifice toward a full flow position. Due to the non-linearity of springs used, it has not been possible to maintain a constant pressure drop across the fixed orifice because the variable orifice will not be positioned linearly with respect to pressure changes on the downstream side of the fixed orifice.

In addition to the foregoing, none of the previously constructed constant flow control valves have included any means of indicating movements of the variable orifice member. The movement of the variable orifice member can be utilized to indicate functional changes occurring within the hydraulic circuit. For example, deviations from a normal recorded pattern made by an indicator operably connected with the variable orifice member can be utilized to predict pump failures downstream from the valve or to indicate valve failures either in the upstream fluid supply pump or in the downstream pump.

This invention generally contemplates an improved constant volume flow control valve that includes a valve body having a piston reciprocally mounted in a chamber therein. The valve body has an inlet passageway in communication with the chamber through an aperture in the piston. Means is provided in the valve body cooperable with the piston to vary the effective flow area of the aperture. An outlet passageway extends from the chamber through the valve body and an orifice is disposed in the passageway whereby fluid flowing from the chamber passes through the orifice to the outlet of the valve. One end of the piston is exposed to the pressure in the chamber adjacent the upstream side of the orifice and the other end of the piston is exposed to the pressure in the outlet of the valve through the passageway connecting the chamber with the valve outlet, whereby the flow area of the aperture will be varied as the downstream pressure changes to maintain a constant pressure drop across the orifice and, consequently, a constant volume of fluid flow through the valve.

In another aspect of the invention, the orifice in the passageway is modified by constructing the orifice movable so that it can be varied. However, the flow area therethrough will remain constant so long as the hydraulic device located downstream of the valve will accept such a volume. If the hydraulic device will not accept the full output volume from the valve, then the orifice will move to reflect a decrease in volume flowing therethrough.

It is one object of the invention to provide an improved flow control valve that accurately maintains a constant volume output.

Another object of the invention is to provide an improved flow control valve that provides a means of indicating pressure changes occurring within the hydraulic circuit in which the valve is installed while maintaining a constant volume output.

Still another object of the invention is to provide an improved constant volume flow control valve that can be adjusted to provide the desired output volume.

A further object of the invention is to provide an improved flow control valve that includes a means of indicating the output volume of the flow control valve and simultaneously indicating pressure changes that occur in the hydraulic circuit.

One further object of the invention is to provide an improved flow control valve that requires little maintenance during its service life.

The foregoing and additional objects and advantages of the invention will become more apparent as the following detailed description is read in conjunction with the accompanying drawing wherein like reference characters denote like parts in all views and wherein:

FIG. 2 is a cross-sectional view of the flow control valve of FIG. 1, taken substantially along the line 2—2 of FIG. 1;

FIG. 3 is a fragmentary vertical cross-sectional view of a portion of the flow control valve of FIG. 1 illustrating a modified embodiment thereof;

FIG. 4 is a vertical cross-sectional view of another embodiment of flow control valve, also manufactured in accordance with the invention; and, FIG. 5 is a cross-sectional view of the flow control valve of FIG. 4, taken along the line 5—5 of FIG. 4.

Figure 1:
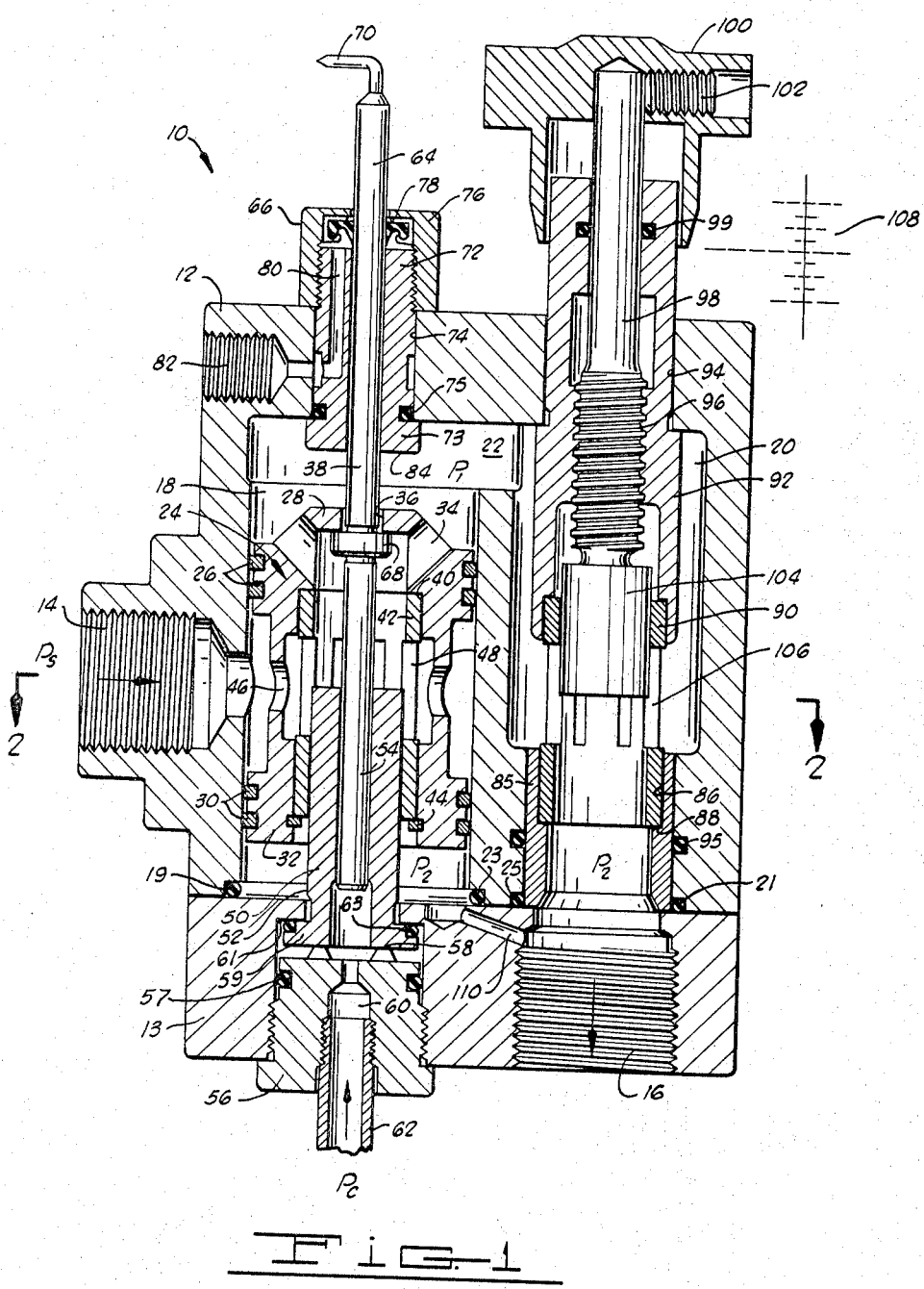
FIG. 1 is a vertical cross-sectional view of a flow control valve constructed in accordance with one aspect of the invention.

Referring to the drawings and to FIGS. 1 and 2 in particular, shown therein and generally designated by the reference character 10 is a constant volume flow control valve constructed in accordance with the invention. As illustrated therein, the valve 10 includes the valve body 12 having an inlet passageway 14, a first or piston chamber 18 which is in communication with the inlet passageway 14, a second or orifice chamber 20, and an opening 22 connecting the chambers 18 and 20.

The valve 10 also includes a separable head member 13 which is connected with the valve body 12 by suitable fastners (not shown). An outlet passageway 16 extends through the valve head 13 into the orifice chamber 20. O-ring seals 19 and 21 are disposed in annular grooves 23 and 25, respectively, in the valve body 12 adjacent to and forming a seal with the head member 13.

A piston 24 is slidingly disposed in the chamber 18. Annular sealing rings 26 encircle the exterior of the upper portion 28 of the piston 24 and sealingly and slidingly engage the valve body 12. Annular sealing rings 30 encircle the exterior of a lower end 32 of the piston 24 and slidingly and sealingly engage the valve body 12. The sealing rings 26 and 30 are spaced so that, in all operating conditions of the piston 24, they will be disposed on either side of the inlet passageway 14 for purposes which will become more apparent as the description proceeds.

The piston 24 may be described generally as being tubular, however, the upper end 28 is partially closed. A plurality of apertures 34 extend angularly through the upper end 28 and an opening 36 extends axially therethrough. A rod-like member 38, which will be described in detail hereinafter, extends through the opening 36. The interior of the piston 24 is counterbored from the lower end 32 providing a downwardly facing shoulder 40 which is in engagement with the upper end of an orifice member 42. The lower end of the orifice member 42 is in engagement with a retaining ring 44 which is mounted in the piston 24. The retaining ring 44 holds the orifice member 42 within the piston 24. A plurality of apertures 46 extend through the medial portion of the wall of the piston 24 and are in fluid communication with the inlet passageway 14.

The orifice member 42 is generally tubular and is provided with a plurality of elongated openings or orifices 48 (see FIG. 2) which are radially spaced about the orifice member 42 and are in fluid communication with the apertures 46 in the piston 24. The orifices 48 are preferably rectangular so that the flow area thereof can be accurately determined and will be varied in a linear manner as described more fully hereinafter. The arrangement of the piston 24 and orifice member 42 is such that the fluid may flow from the inlet passageway 14, through the apertures 46, the orifices 48, through the openings 34 in the upper end of the piston 24 and into the chamber 18 above the piston 24.

A cylindrical member 50 projects upwardly into the chamber 18 from the head member 13 and has an exterior 52 sized to fit closely within the orifice member 42. The member 50 extends into the chamber 18 a sufficient distance so that it will obstruct the orifices 48 except when the piston 24 is in its uppermost position and so that the orifices 48 will be completely closed when the piston 24 is in its lowermost position. It can be seen that the flow area of the orifices 48 will be changed in any intermediate position of the piston 24, and, due to the rectangular configuration of the orifices 48, that the change will be linear as the orifices 48 come into juxtaposition with the member 50. The member 50 has an interior diameter sized to slidingly receive a lower end 54 of the rod-like member 38.

As illustrated in the FIG. 1, the member 50 is retained in the head member 13 by means of an adapter 56 which is threadedly engaged with the head member 13. An O-ring seal 57 encircles the adapter 56 to prevent fluid leakage by the threaded connection. The upper end 58 of the adapter 56 is in engagement with the lower flanged end 59 of the member 50 forcing the flanged end 59 into engagement with a downwardly facing shoulder 61 in the head member 13 thereby securing the member 50 in the body 12. An O-ring seal 63 is disposed between the flanged end 61 and the shoulder 63 providing a fluid tight seal therebetween.

A partially threaded bore 60 extends through the adapter member 54 and is sized to receive one end of a threaded conduit 62. The other end of the conduit 62 will be connected to a fluid source (not shown) which is at a constant pressure $P_c$. The bore 60 is in fluid communication with the interior of the cylindrical member 50 so that the pressure $P_c$ is exerted on the lower end 54 of the rod-like member 38.

In addition to the lower end portion 54, the rod-like member 38 also includes an upper portion 64 which extends through a packing gland 66 in the valve body 12. An enlarged flange 68 on the rod portion 64 engages the upper portion 28 of the piston 24. The uppermost end of the upper portion 64 which extends through the valve body 12 is provided with a pointer or stylus 70 which may be used to indicate the position of the rod-like member 38, to make a chart (not shown) of the position thereof, or to actuate a dial indicator (not shown).

The packing gland 66 includes an inner member 72 which extends through an opening 74 in the valve body and has an interior sized to closely receive the upper portion 64 of the rod-like member 38. The lower end of the inner member 72 is provided with an annular flange 73 which engages the body 12 within the chamber 18 to hold the packing gland 66 against upward movement. The upper end of the inner member 72 is threaded to receive a sealing cap 76. The sealing cap 76 threadedly engages the inner member 72 and is provided with a resilient seal 78 to prevent the escape of fluid from the valve body 12. An O-ring seal 75 encircles the inner member 72 and sealingly engages the valve body 12 within the opening 74 to prevent the leakage of fluid thereby.

The inner member 72 is provided with a passageway 80 which is in communication with a port 82 in the valve body. The passageway 80 is also in communication with the interior of the member 76 below the seal 78 so that any fluid that escapes between the upper portion 64 of the rod-like member 38 and the inner member 72 can flow therethrough. The port 82 is threaded and receives one end of a conduit (not shown) which can carry fluids in the passageway 80 to a reservoir (not shown) which will be at atmospheric pressure. The lower surface 84 of the inner member 72 serves as a stop and is engageable with the upper end 28 of the piston 24 to limit the upward travel of the piston 24 in the chamber 18.

The lower end of the chamber 20 is provided with a sleeve 85 having a counterbore 86 providing an upwardly facing shoulder 88 for receiving the lower end of a tubular orifice member 90. The orifice member 90 is retained in position in the sleeve 85 by an orifice support member 92 which extends through an opening 94 in the valve body 12. An O-ring seal 95 is disposed in the body 12 encircling the sleeve 85 to prevent leakage of fluid therebetween. The sleeve 85 is provided so that the support member 92 can be inserted in the chamber 20.

The support member 92 is partially threaded, as shown at 96, to receive a threaded member 98 which extends through the support member 92. An O-ring seal 99 encircles the member 98 sealingly engaging the support member 92 to prevent leakage of fluid therebetween. An adjusting knob 100 is rigidly connected to the upper end of the member 98 by a set screw 102. The lower end of the threaded member 98 is connected with a cylindrical plug member 104 which is sized to fit closely within the orifice member 90.

The orifice member 90 is provided with a plurality of elongated orifices 106 which permit fluid flow from the chamber 20 to the outlet passageway 16. The effective flow area of the orifices 106 is determined by the position of the cylindrical plug member 104, which position can be adjusted by rotating the knob 100. The orifices 106 are preferably rectangular as illustrated so that the flow area therethrough will vary linearly as the plug member 104 is moved in juxtaposition with the orifices 106. If desired, the adjustable orifice arrangement illustrated could be replaced by a fixed orifice member (not shown) of the specified size.

When using the adjustable orifice illustrated in FIG. 1, a scale, such as is illustrated at 108, is preferably used in conjunction with the knob 100 so that the user of the valve 10 will be able to observe the position of the plug member 104 or flow area of the orifices 106 of the orifice member 90. The use of such scales in connection with needle valves and other types of flow control valves is well known and it is not believed that further explanation is necessary.

A connecting passageway 110 formed in the head 13 provides fluid communication from the outlet passageway 16 to the interior of the chamber 18 adjacent the lower end 32 of the piston 24. It is important to note that the connecting passageway 110 joins the outlet passageway 16 downstream from the orifice member 90.

Operation of the embodiment of FIG. 1

The valve 10 is connected in the hydraulic circuit (not shown) so that the inlet passageway 14 will be connected with a source of fluid (not shown). The fluid source should be sufficient, both in volume and pressure to cause the valve 10 to operate at full flow and to cause the functioning of a hydraulic device (not shown) connected to the outlet passageway 16. Furthermore, the hydraulic device (not shown) must be capable of accepting, at least the volume of fluid being delivered through the valve 10.

It should also be understood that the volume of fluid flowing through an orifice, such as the orifices 106 of the orifice member 90, is determined by the pressure differential as measured from the upstream to the downstream side of the orifice. In FIG. 1, the supply pressure is designated $P_s$, the upstream pressure is designated $P_1$ and the downstream pressure of the orifice member 90 is designated $P_2$. If fluid is to flow through the valve 10, the pressure $P_s$ must be greater than $P_1$ and $P_1$ must be greater than $P_2$.

If $P_1$ and $P_2$ remain constant and the flow area of the orifices 106 is not changed, then fluid will flow through the orifices 106 at a constant volume. If, however, $P_2$ should increase without a corresponding increase in $P_1$ so that the value of $P_1$ minus $P_2$ changes, then the volume of fluid flowing through the valve 10 will change. If $P_2$ increases without a change in $P_1$ the volume flowing will decrease and if $P_2$ decreases without a change in $P_1$ the volume flowing will increase.

Since $P_1$ must be greater than $P_2$ for fluid flow to occur, it is necessary to provide an additional upwardly directed force to the piston 24 so that it can be placed in equilibrium. The additional upwardly directed force provided by supplying, through the conduit 62 and the bore 60, a constant pressure $P_c$. The pressure $P_c$ will be exerted on the lower end 54 of the rod-like member 38 developing an upwardly directed force because the upper end 64 thereof is exposed to the atmosphere.

As previously described, the flange 68 on the rod-like member 38 is in engagement with the upper end 28 of the piston 24, therefore, the pressure $P_c$ will attempt to move the piston 24 upwardly in the chamber 18. With fluid flowing through the valve 10, the piston 24 will be in equilibrium so long as the pressure drop across the orifices 106 is of the preselected value. Due to the equilibrium condition of the piston 24, it can be appreciated that a small imbalance between the $P_1$ and $P_2$ pressures will quickly and easily cause movement of the piston 24.

It should also be pointed out that the supply pressure $P_s$ will have no influence on the movement of the piston 24 because of the equal areas upon which the $P_s$ pressure will act before passing through the orifices 48 in the orifice member 42. Also as previously described, the seal rings 26 and 30 will be positioned on opposite sides of the inlet passageway 14 in all operative positions of the piston 24 so that the $P_s$ pressure will always act on the equal areas and will not have any effect of the movement of the piston 24.

With the foregoing principles in mind, the knob 100 is rotated, moving the cylindrical plug 104 adjacent the orifices 106 until the desired volume of fluid flow is attained. If the work load on the hydraulic device (not shown) to which fluid is flowing increases, a corresponding increase will occur in $P_2$ in the outlet passageway 16. To prevent a decrease in the volume of fluid flowing, the increased $P_2$ pressure is exerted on the lower end 32 of the piston 24 through the connecting passageway 110. Increasing the $P_2$ pressure in the chamber 18 results in an upward movement of the piston 24 in the chamber 18, opening the orifices 48 in the orifice member 42 and admitting a larger flow from the inlet passageway 14, resulting in an increase in the $P_1$ pressure because of the influence of the higher $P_s$ pressure. $P_1$ will increase until the piston 24 reaches equilibrium, which occurs when $P_1$ minus $P_2$ again attains the required value to attain the preselected flow. Under the foregoing conditions, it can be seen that the $P_2$ value is higher, but that a corresponding increase in the $P_1$ value takes place so that $P_1$ minus $P_2$ remains equal to the $P_1$ minus $P_2$ value required to produce the desired flow through the orifices 106.

The valve has now attained an operating stage wherein the increase in energy requirement, i.e., an increase in $P_2$ has occurred, but a constant volume of fluid is still being supplied to the hydraulic device (not shown) to maintain its constant speed operation whether it be the rotation of a hydraulic motor or reciprocation of hydraulic motor.

Similarly, should the $P_2$ value decrease, due to a decrease in load on the hydraulic device (not shown), the $P_2$ pressure in the chamber 18 being exerted on the lower end 32 of the piston 24 will likewise decrease so that the piston 24 is unbalanced in a downwardly direction. The piston 24 moves downwardly under the influence of the $P_1$ pressure exerted on the upper end 28 thereof, causing the orifices 48 to move into juxtaposition with the cylindrical member 50, restricting the orifices 48 so that less fluid from the inlet passageway can flow into the opening 22. The influence of the $P_s$ pressure is decreased resulting in a decrease in the $P_1$ pressure. The piston 24 will continue to move downwardly until it is again in equilibrium. The equilibrium condition occurs, as before, when the $P_1$ minus $P_2$ value across the piston 24 is equal to the preselected $P_1$ minus $P_2$ value across the orifices 106.

In previously known constant volume flow control valves, the structure controlling the variable orifice is biased by a compression type spring. Manifestly, the pressure drop across the fixed orifice cannot be accurately maintained because the spring rate of compression and extension of the springs varies during compression and extension of the springs. Using a constant pressure instead of a spring, the same biasing force will be generated on the piston 24 regardless of the position thereof as the piston 24 reciprocates to maintain the preselected pressure drop across the orifices 106.

The valve 10 has an additional feature which is believed to be very advantageous, that is, the provision of a stylus or indicator 70 connected with the upper end 64 of the rod-like member 38. Since the rod-like member 38 moves with the piston 24, the movement of the stylus 70 will indicate precisely the movement of the piston 24 and will therefore indicate pressure changes occurring in the hydraulic system. For example, if the valve 10 were connected to a reciprocating hydraulic motor used to power a reciprocating pump (not shown), in a service application wherein the pump would be loaded in one direction of movement and unloaded in the other, a larger $P_2$ pressure would be required during the power stroke than during the return stroke. The piston 24 (and the stylus 70) would move upwardly during the power stroke to provide a larger $P_1$ value to maintain the pressure drop constant across the orifices 106 because of the increased $P_2$ required. The piston 24 (and stylus 70) would move downwardly during the return stroke to maintain a constant pressure drop because of the decreased $P_2$. If the stylus 70 were scribing a line on a time oriented recording device (not shown), it would be possible to ascertain precisely when and how long each stroke required.

As previously mentioned, the foregoing is based on the assumption that a fairly constant and certainly sufficient $P_s$ pressure and volume is available. If for some reason the $P_s$ value should fluctuate violently the piston 24 will move upwardly and downwardly in the chamber 18 to compensate for the fluctuations of $P_s$ to maintain a constant pressure drop across the orifices 106. Even though the piston 24 is balanced with respect to $P_s$ pressure, violent fluctuations of $P_s$ will rapidly change $P_1$ with a somewhat delayed effect on $P_2$, thereby causing the piston 24 to move in a direction counteracting the change in $P_1$.

In such instances, it would not be possible to ascertain directly from a chart of the movement of the stylus 70 whether the fluctuations were occurring upstream or downstream of the valve 10 without additional information about the hydraulic circuit. However, the stylus 70 would indicate that changes were occurring in the system.

FIG. 3 illustrates a modification of the valve 10 which may be used when the power supply is dependable and reasonably constant. In the embodiment shown in FIG. 3, the valve body 12 has been modified by forming a passageway 120 therein which provides fluid communication from the inlet passageway 14 to the interior of the cylindrical member 50. The adapter member 56, instead of having the conduit 62 connected therewith, has the bore 60 plugged by means of a threaded plug 122 to prevent the escape of fluid from the bore 60.

As a result of the provision of the passageway 120 and the plug 122, the pressure $P_s$ will be exerted on the lower end 54 of the rod-like member 38 exerting a biasing force on the piston 24 thereby eliminating the necessity of providing a separate constant pressure fluid supply as is true with the embodiment of FIG. 1. No change results in the function or the operation of the valve 10 as a result of the aforedescribed modification.

FIGS. 4 and 5 illustrate another embodiment of the flow control valve which is generally designated by the reference character 130. As shown therein, the valve 130 includes a valve body 132 which has an inlet passageway 134, an outlet passageway 136, a first or piston chamber 138, a second or orifice chamber 140, and an opening 142 connecting the chambers 138 and 140.

Due to the identity of a portion of the components of the valve 130 with those of the valve 10, a detailed description of those identical components will not be made and they will be designated in FIGS. 4 and 5 by the same reference characters used in FIGS. 1 and 2.

The piston 24 is reciprocally mounted in the chamber 138 of the valve 130 and functions in conjunction with the cylindrical projection 50, the adapter 56, rod-like member 38, conduit 62 and stuffing box 66 precisely as described in connection with the same members in the valve 10 previously described. It should be pointed out that the interior member 72 of the stuffing box 66 has been rotated so that the passageway 80 is in communication with a passageway 146 in an interior member 149 of a similar packing or stuffing box 148. The interior member 149, which extends through the valve body 132 into the chamber 140 is encircled by an O-ring seal 153 to prevent leakage of fluid thereby. A flange 151 on the interior member 149 engages the interior of the valve body 132 within the chamber 140 to prevent upward movement of the stuffing box 148.

The passageway 146 is in communication with a threaded port 150 in the body 132 which is adapted to receive one end of a conduit (not shown). The other end of the conduit (not shown) will be connected with a fluid reservoir (not shown).

An orifice member 152 is slidingly disposed in the chamber 140. A lower end 154 of the orifice member 152 is connected by a snap ring 156 with a rod-like member 158 which extends axially through the orifice member 152, upwardly through the stuffing box 148. The lower end 154 includes a small chamber 155 which is in communication with the interior of the orifice member 152 by means of an opening 157 through which the rod-like member 158 extends. The upper end of the rod-like member 158, which is outside the valve body 132, is provided with a stylus or indicator 162.

The orifice member 152 has a plurality of orifices 164 extending therethrough as may be seen more clearly in FIG. 5. A stop member 166 encircles the rod-like member 158 within the orifice member 152 and is engageable with a lower end 168 of the interior member 149 of the stuffing box 148 to limit the upward travel of the orifice member 152 in the chamber 140.

To limit the downward travel of the orifice member 152 in the chamber 140 and thereby determining the maximum flow area of the orifices 164, an adjustable stop 170 extends through a head member 171. The head member 171 is connected with the valve body 132 by suitable fasteners (not shown). O-ring seals 173 and 175 are sealingly disposed between the head member 171 and body 132.

The adjustable stop 170 is retained in the valve body 132 by the engagement of a shoulder 172 on a stop support member 174 with the interior of the head member 171 and a lock nut 176 which is screwed onto threads 178 on the exterior of the stop support member 174. An adjustable stop member 180 extends axially through the stop support member 174 and has its upper end in engagement with the lower end 154 of the orifice member 152 and has an adjusting handle 182 rotatably connected to its other end.

The rotatable handle 182 is provided with interior threads which are in engagement with the threads 178 on the stop support member 174 so that the adjustable stop member 180 can be moved in and out of the orifice chamber 140 by rotation of the handle 182. Rotation of the handle 182 is possible due to the bearing 183 located between the handle 182 and stop member 180. The handle 182 and bearing 183 is retained on the stop member 180 by a threaded fastner 185 which extends through the bearing 183 into threaded engagement with the stop member 180. To prevent rotation of the stop member 180, a key 184 is mounted on the interior of the stop support member 174 and is positioned in a key way 186 in the end of the stop member 180 adjacent the handle 182.

The end of the stop member 180 extending into the chamber 140 is counterbored as shown at 188 to slidingly receive a rod-like member 190. If desired, the rod-like member 190 can be a lower extension of the rod-like member 158, but because of the alignment problems involved in manufacturing the valve 130, it is preferred that the member 190 be separate as illustrated. However, the member 190 should have the same cross-sectional area as the member 158.

The lower end of the member 190 is exposed to the constant pressure $P_c$ supplied through the conduit 62 through a series of passageways designated by the reference character 192. The $P_c$ pressure is isolated adjacent the lower end of the rod-like member 190 by two pair of spaced O-rings 191–193 and 195–197 which are sealingly disposed between the head member 171 and stop support member 174 and between the stop member 180 and stop support member 174, respectively.

A connecting passageway 194 extends from the lower end of the chamber 140 to the lower end of the chamber 138. The connecting passageway 194 is provided so that the pressure $P_2$, which is the pressure downstream of the valve 130, will be exerted on the lower end 32 of the piston 24.

*Operation of the embodiment of FIG. 4*

With the valve 130 installed in the hydraulic circuit (not shown) and assuming that the inlet 134 is connected with a source of fluid that has sufficient volume and pressure to operate the valve 130 at full flow condition to operate a hydraulic device (not shown) which is connected to the outlet 136. If the hydraulic device will accept the full flow of fluid from the valve 130, the valve 130 functions in a manner identical to the operation of the valve 10 previously described.

Many hydraulic devices which may be controlled by the valve 130 may include instantaneous periods during which they will accept no fluid or only a portion of the fluid delivered by the valve 130. For example, during the period in which the reversing or main valve of a reciprocating motor driving a subsurface pump is actuated to cause a reversal in direction of movement of the pump, the fluid motor will accept little if any fluid. Also, there may be periods during which the hydraulic device continues to function and accept fluid from the valve 130, but at a substantially reduced volume due to the intentional actuation of a throttling valve or to a partially plugged port or valve.

The valve 130 includes a moveable orifice member 152 which moves in response to changes in the volume of fluid flowing and will indicate when such reduced volume consumption periods occur.

That the orifice member 152 moves in response to volume changes can be shown by analyzing the moveable orifice member 152. A downwardly directed force on the orifice member 152 results from a pressure $P_1$ in the opening 142 being applied across an area equal to the area of the orifice member 152 minus the area of the rod-like member 158. Similarly, an upwardly directed force on the orifice member 152 is equal to the sum of the downstream pressure $P_2$ applied across the area of the orifice member 152 minus the area of the rod-like member 190 plus the constant pressure, $P_c$, times the area of the rod-like member 190. The mathematical solution to the relationship stated reveals that the pressure drop across the orifices 164 is equal to $P_1$ minus $P_2$ and is proportional to the pressure $P_c$. It should be pointed out that, so long as $P_c$ is greater than $P_2$, the mathematical solution remains the same whether the rod-like member 158 is connected as shown, screwed into the orifice member 152, or connected with the member 190 to form a continuous member. For example, $P_1$ acts downwardly and upwardly on an area equal to the member 158, therefore the resultant downward force on the member 152 is $P_1$ times the area of the member 152 minus the area of the member 158 as stated above.

Since the volume flowing through the orifices 164 would, if the orifice member 152 were fixed, tend to cause an increase in the pressure drop across the orifices 164, the orifice member 152 would move downwardly against the force exerted by the rod-like member 190 to maintain the pressure drop constant as shown by the mathematical analysis.

As arranged in the valve 130, the movement of the moveable orifice member 152 is limited by the adjustable stop 170, thereby determining the maximum effective flow area of orifice that can be obtained. With full volume flowing, the combination of the movable orifice member 152 with the pressure actuated piston 24, which moves in response to the pressure drop across the orifices 164, i.e., the differential pressure $P_1$ minus $P_2$, there is provided a constant flow control valve, which as previously stated, functions exactly as does the valve 10 of the FIG. 1.

If the valve 130 were attached to a reciprocating hydraulic motor and the motor encountered an object which it could not move and therefore became stalled, the motor would no longer accept fluid from the valve 130. When the motor refuses to accept additional fluid and the flow ceases or began to decrease, $P_1$ and $P_2$ begin to equalize and the constant pressure $P_c$ exerts an upward force on the moveable orifice member 152 moving it into the closed position. Simultaneously, the stylus 162 makes a vertical mark, or indicates, by its upward movement, that the flow has decreased or stopped in the valve 130.

At the same time, the pressure $P^2$ would increase causing the piston 24 to move upwardly opening the orifices 48 in the orifice member 42. Since the circuit will accept no additional fluid even at an increased pressure, which will rise to equal $P_s$, the stylus 70 and the stylus 162 will rise to the maximum upward position. The upward movement of the piston 24 indicates that the downstream pressure has increased in the system.

If fluid flow continues, but at a decreased rate, the orifice member 158 and stylus 162 move to an intermediate position wherein the effective flow area of the orifices 164 is adequate to maintain a constant $P_1$ minus $P_2$ value across the orifice member 158. The position of the orifice member 158 is determined by the pressure $P_c$ which is holding the orifice member 158 against downward movement due to flow therethrough as shown by the mathematical analysis.

If the flow stoppage should be only temporary, such as when the valve throw occurs in a hydraulic motor driving a subsurface pump, the resumption of fluid flow thereto would move the movable orifice 152 against the adjustable stop member 180; assuming that the pump would accept the full volume of flow after reversal of the valve. If the motor will not accept the full volume flowing from the valve 130, the orifice member 152 will position itself in accordance with the volume flowing as previously described. Less than full flow will be indicated by the stylus 162 because it will be positioned at some point, corresponding to the volume flowing, above the lowest position of the stylus 162 which indicates full flow through the valve 130.

It should be emphasized that the valve 130 functions as a constant volume flow control valve as long as the hydraulic circuit will accept the volume of fluid which the valve 130 is adjusted to deliver. The valve 130 provides the additional advantage of indicating that the downstream circuit will not accept the desired or preselected volume even at the maximum pressure $P_s$ available. Furthermore, the stylus 162 can be used to record the volume flowing when such volume is less than the preselected volume.

It should be understood that the embodiments described in detail hereinbefore are presented by way of example and that many changes and modifications can be made thereto without departing from the spirit of the invention or from the scope of the annexed claims.

What I claim is:

1. Apparatus for controlling the flow of fluid from a source of fluid under pressure to a fluid driven device, comprising:

a body having a chamber therein, said chamber having a first end and a second end, said body also having an inlet therein providing communication between the source of fluid and the first end of said chamber, an outlet passageway extending from the first end of said chamber for communication with the fluid driven device, and a connecting passageway between the second end of said chamber and a portion of the outlet passageway spaced from the first end of said chamber;

a pressure responsive piston reciprocally disposed in said chamber;

first orifice means carried by said piston and arranged between said inlet and the first end of said chamber for reducing the pressure of the fluid flowing from the inlet into the first end of said chamber, said first orifice means being adjustable in response to movement of the piston;

second orifice means in said outlet passageway between the first end of said chamber and said connecting passageway providing a pressure drop for fluid flowing from the first end of said chamber to the fluid driven device and for imposing a lower pressure in the second end of said chamber through said connecting passageway;

a rod-like member engaged with and extending axially through said piston, said member having one end extending through said body; and means for exerting a constant force on said rod-like member whereby said piston is constantly biased toward the first end of said chamber; including a second chamber in the body adjacent the opposite end of said rod-like member containing a fluid under constant pressure, whereby said piston moves to adjust the first orifice means in response to changes in the pressure of the fluid at said connecting passageway to maintain a constant pressure drop through said second orifice means and a constant flow of fluid to the fluid driven device.

2. Apparatus for controlling the flow of fluid from a source of fluid under pressure to a fluid driven device, comprising:

a body having a first chamber therein with first and second ends, a second chamber therein with first and second ends, an opening in the body providing communication between the first end of the first chamber and the first end of the second chamber, a connecting passageway between the second end of the first chamber and the second end of the second chamber, an inlet providing communication between the fluid source and a medial portion of the first chamber, and an outlet providing communication between the second end of the second chamber and the fluid driven device;

an adjustable orifice means in the second chamber producing a pressure drop for fluid flowing from the first to the second end of the second chamber;

a piston reciprocally disposed in the first chamber and being responsive to the pressure of the fluid in the first and second ends of the first chamber;

orifice means in the piston controlling the flow of fluid from said inlet to the first end of the first chamber, said orifice means being relatively opened and relatively closed in response to reciprocating movement of the piston in the first chamber;

an indicator rod extending through said body and engaging said piston, said indicator rod being movable in response to movement of said piston to indicate changes in fluid pressure downstream of said apparatus;

means for exerting a constant force on said rod whereby said piston is constantly biased toward the first end of said chamber, said means including a chamber in said body containing a fluid under constant pressure, whereby the piston changes its position in the first chamber in response to variations in the pressure at said outlet and seeks a position wherein the pressures of the fluid in the opposite ends of the first chamber are at a predetermined difference to maintain a constant volume of fluid flowing through said adjustable orifice and to the fluid driven device.

3. Apparatus for controlling the flow of fluid from a source of fluid under pressure to a fluid driven device, comprising:

a body having a first chamber therein with first and second ends, a second chamber therein with first and second ends, an opening in the body providing communication between the first end of the first chamber and the first end of the second chamber, a connecting passageway between the second end of the first chamber and the second end of the second chamber, an inlet providing communication between the fluid source and a medial portion of the first chamber, and an outlet-providing communication between the second end of the second chamber and the fluid driven device;

an adjustable orifice means in the second chamber producing a pressure drop for fluid flowing from the first to the second end of the second chamber;

a piston reciprocally disposed in the first chamber and being responsive to the pressure of the fluid in the first and second ends of the first chamber;

orifice means in the piston controlling the flow of fluid from said inlet to the first end of the first chamber, said orifice means being relatively opened and relatively closed in response to reciprocating movement of the piston in the first chamber;

an indicator rod extending through said body and engaging said piston, said indicator rod being moveable in response to movement of said piston to indicate changes in fluid pressure downstream of said apparatus;

means urging the piston toward the first end of the first chamber with a constant force, whereby the piston changes its position in the first chamber in response to variations in the pressure at said outlet and seeks a position wherein the pressure of the fluid in the opposite ends of the first chamber are at a predetermined difference to maintain a constant volume of fluid flowing through said adjustable orifice and to the fluid driven device;

said orifice means including:

an orifice support member extending through said body and having a threaded interior portion;

a tubular orifice member supported by said orifice support member and said body and having a plurality of orifices extending through the wall thereof;

a cylindrical plug member moveably mounted in said tubular orifice member; and a threaded member connected with said cylindrical plug and engaged with the threaded interior portion of said orifice support member, whereby said plug member can be moved relative to said orifices to control the flow area of said orifices.

4. Apparatus for controlling the flow of fluid from a source of fluid under pressure to a fluid driven device, comprising:

a body having a chamber therein, said chamber having a first end and a second end, said body also having an inlet therein providing communication between the source of fluid and the first end of said chamber, an outlet passageway extending from the first end of said chamber for communication with the fluid driven device, and a connecting passageway between the second end of said chamber and a portion of the outlet passageway spaced from the first end of said chamber;

a pressure responsive piston reciprocally disposed in said chamber;

first orifice means carried by said piston and arranged between said inlet and the first end of said chamber for reducing the pressure of the fluid flowing from the inlet into the first end of said chamber, said first orifice means being adjustable in response to movement of the piston;

an indicator rod extending through said body and axially through and engaging said piston, said indicator rod being moveable in response to movement of said piston indicating the changes in fluid pressure downstream of said apparatus;

second orifice means in said outlet passageway between the first end of said chamber and said connecting passageway providing a pressure drop for fluid flowing from the first end of said chamber to the fluid driven device and for imposing a lower pressure in the second end of said chamber through said connecting passageway;

means urging the piston toward the first end of said chamber with a constant force, whereby the piston changes its position in said chamber in response to variations in the rpessure at said outlet passageway and seeks a position wherein the pressure of the fluid in the opposite ends of the chamber are at a predetermined difference to maintain a constant volume of fluid flowing through said adjustable orifice and to the fluid driven device, wherein said body also includes a cylindrical member projecting into said chamber, said cylindrical member having an aperture extending axially therethrough into communication with a second chamber formed in said body, said cylindrical member having an outside diameter slidingly receiving said first orifice means and piston;

said first orifice means includes a plurality of rectangular orifices extending therethrough and disposed adjacent said cylindrical member whereby movement of said piston and first orifice means varies the flow area of said orifices as defined by said cylindrical member and rectangular orifices;

said piston includes spaced seal means sealingly and slidingly engaging said body in said chamber, said seal means being located on opposite sides of said inlet; and said constant force means includes
a source of constant pressure fluid connected in communication with said second chamber; and
a rod-like member slidingly disposed in the aperture in said cylindrical member having one end engaging said piston and the other end exposed to said constant pressure fluid, whereby said piston and first orifice means are constantly biased toward a position fully opening said orifices.

5. Apparatus for controlling the flow of fluid from a source of fluid under pressure to a fluid driven device, comprising:

a body having a first chamber therein with first and second ends, a second chamber therein with first and second ends, an opening in the body providing communication between the first end of the first chamber and the first end of the second chamber, a connecting passageway between the second end of the first chamber and the second end of the second chamber, an inlet providing communication between the fluid source and a medial portion of the first chamber, and an outlet providing communication between the medial portion of the second chamber and the fluid driven device;

a piston reciprocally disposed in the first chamber and being responsive to the pressure of the fluid in the first and second ends of the first chamber;

orifice means in the piston controlling the flow of fluid from said inlet to the first end of the first chamber said orifice means being relatively opened and relatively closed in response to the reciprocating movement of the piston in the first chamber;

an orifice member moveably mounted in the second chamber producing a pressure drop of fluid flowing from the first end to the second end of the second chamber; and, means urging the piston and the orifice member toward the first end of the first chamber and the first end of the second chamber, respectively, with a constant force, whereby the piston changes its position in the first chamber in response to variations in the pressure at said outlet and seeks a position wherein the pressure of the fluid in the opposite ends of the first chamber are at predetermined difference to maintain a constant volume of fluid flowing through said adjustable orifice and to the fluid driven device, and whereby the orifice member changes its position in the second chamber in response to variations in the fluid flowing through the second chamber to maintain a constant pressure drop across the orifice member.

6. The apparatus of claim 5 and also including an indicator rod extending through said body and engaging said piston, said indicator rod being moveable in response to movement of said piston to indicate changes in fluid pressure downstream of said apparatus.

7. The apparatus of claim 6 and also including a second indicator rod extending through said body and engaging said orifice member, said second indicator rod being moveable in response to movement of said orifice member to indicate the volume of fluid flowing through said apparatus.

8. The apparatus of claim 5 wherein
said body also includes a cylindrical member projecting into said first chamber, said cylindrical member having an aperture extending axially therethrough into communication with a third chamber formed in said body, said cylindrical member having an outside diameter slidingly receiving said orifice means and piston;

said orifice means includes a plurality of rectangular orifices extending therethrough and disposed adjacent said cylindrical member whereby movement of said piston and orifice means varies the flow area of said orifices as defined by said cylindrical member and rectangular orifices;

said piston includes spaced seal means sealingly and slidingly engaging said body in said chamber, said seal means being located on opposite sides of said inlet; and, said constant force means includes
a source of constant pressure fluid connected in communication with said third chamber, and
a rod-like member slidingly disposed in the aperture in said cylindrical member having one end engaging said piston and the other end exposed to said constant pressure fluid, whereby said piston and orifice means are constantly biased toward a position fully opening said orifices.

9. The apparatus of claim 5 and also including an adjustable stop member mounted in said body and projecting into said second chamber and engageable with said orifice member to limit the movement thereof in a direction toward the second end of the second chamber.

10. The apparatus of claim 9 and also including:
a rod-like member engaged with and extending axially through the said orifice member, said rod-like member having one end extending through said body; and,
a source of fluid under constant pressure connected to impose a constant force on said rod-like member, whereby said orifice member is constantly biased toward the first end of said second chamber.

11. The apparatus of claim 10 and also including a second rod-like member engaged with and extending axially through said piston, said second rod-like member having one end extending through said body and being operably connected with said source of fluid under constant pressure whereby a constant force is exerted on said piston in a direction to counteract the force imposed upon the piston by the fluid in the first end of said first chamber.

References Cited

UNITED STATES PATENTS

| | | | |
|---|---|---|---|
| 868,219 | 10/1907 | Pietzuch et al. | 137—505.18 X |
| 1,640,842 | 8/1927 | Loomis | 137—501 |
| 2,087,037 | 7/1937 | McCarthy | 137—501 X |
| 2,867,268 | 1/1959 | Brown | 137—501 X |
| 2,919,590 | 1/1960 | Griswold | 137—556 X |
| 3,026,904 | 3/1962 | Dollison | 137—556 |
| 3,177,892 | 4/1965 | Grandstaff | 137—501 |

M. CARY NELSON, *Primary Examiner.*

MARTIN P. SCHWADRON, *Examiner.*

R. J. MILLER, *Assistant Examiner.*